United States Patent [19]
Hirai

[11] Patent Number: 5,970,263
[45] Date of Patent: Oct. 19, 1999

[54] PHOTOMETERING LENS FOR SLR CAMERA AND ADJUSTING OF PHOTOMETERING DEVICE

[75] Inventor: Isamu Hirai, Tokyo, Japan

[73] Assignee: Asahi Kogaku Kogyo Kabushiki Kaisha, Tokyo, Japan

[21] Appl. No.: 09/115,547

[22] Filed: Jul. 15, 1998

[30] Foreign Application Priority Data

Jul. 16, 1997 [JP] Japan .................................. 9-190997

[51] Int. Cl.$^6$ ........................... G03B 7/099; G03B 43/00
[52] U.S. Cl. ............................................................ 396/271
[58] Field of Search ..................................... 396/271, 268

[56] References Cited

U.S. PATENT DOCUMENTS

| | | | |
|---|---|---|---|
| 3,690,241 | 9/1972 | Nomura | 396/233 |
| 4,019,191 | 4/1977 | Miyata | 396/271 |
| 4,626,918 | 12/1986 | Morisawa | 348/341 |
| 5,497,229 | 3/1996 | Sensui et al. | 356/225 |
| 5,585,885 | 12/1996 | Muramatsu | 396/271 X |

Primary Examiner—W. B. Perkey
Attorney, Agent, or Firm—Greenblum & Berstein, P.L.C.

[57] ABSTRACT

In a photometering lens for an SLR camera in which object light transmitted through a finder screen and emitted from a reflecting optical member is received by a light measuring receiver, wherein the photometering lens has a light path for illumination light upon assembling the light measuring receiver, said illumination light being applied from said reflecting optical member toward the light measuring receiver, and wherein the position of said light measuring receiver is determined in accordance with an image of the light measuring receiver formed on the finder screen. An adjusting method of a photometering device having a photometering lens to adjust the position of the light measuring receiver is also disclosed.

13 Claims, 11 Drawing Sheets

Related Art

Related Art

PHOTOMETERING LENS FOR SLR CAMERA AND ADJUSTING OF PHOTOMETERING DEVICE

BACKGROUND OF THE INVENTION

1. Field of the Invention

The present invention relates to a photometering lens of a single lens reflex (SLR) camera, and in particular, it relates to a structure of a photometering lens incorporated in a photometering device in an SLR camera and an adjusting method of the photometering device.

2. Description of the Related Art

In a known type of photometering device for an SLR camera, light transmitted through a finder screen (focusing screen) is received by a light receiving element to measure the brightness of an object.

The basic structure of a conventional SLR camera and photometering lens is shown in FIGS. 10 and 11. A camera body 101 is provided with a photographing lens 103 which is detachably attached thereto. Light carrying an object image incident upon the photographing lens 103 is partly transmitted through a main mirror 105 and is reflected by a sub-mirror 107 toward an AF sensor unit 109. The object light incident upon the photographing lens 103 is partly reflected by the main mirror 105, is converged onto a finder screen (focusing screen) 31 to form (or project) an object image thereon, and passes through the finder screen 31. The finder screen 31 is located at a position which is optically equivalent to a film surface 111. The object light passing through the finder screen 31 is reflected by a hollow pentagonal mirror (a reflecting optical member) 21. The light reflected by the hollow pentagonal mirror 21 partly passes through an eyepiece 41 and is partly transmitted through a photometering lens 11' and is received by a light measuring receiver (a light receiving element) 13. The hollow pentagonal mirror 21 can be replaced by a pentagonal prism per se known.

In the SLR camera mentioned above, position of the light measuring receiver 13 is adjusted to coincide with the image of the finder screen 31. In particular, in case that the light measuring receiver 13 is a center-weighted measuring type or a divided brightness measuring type, it is necessary to precisely make the image of the finder screen 31 coincidental with the light receiving area (measuring area) of the light measuring receiver 13. Namely, the centering operation to register the center of the object image on the finder screen 31 with the center of the central light receiving element of the light measuring receiver 13 must be precisely carried out.

To this end, in the prior art, the relationship between the light measuring receiver 13 and the measuring area is adjusted in such a way that a reference chart is placed in a predetermined position on the optical axis and the position of the photographing lens is adjusted with respect to the reference chart. The output of the central light receiving element of the light measuring receiver 13 is measured while moving the light measuring receiver 13. The position in which the output of the central light receiving element of the light measuring receiver 13 becomes maximum corresponds to the center position.

However, in this adjustment, since the output of the light measuring receiver is measured while moving the light measuring receiver 13, it takes a long time to detect the peak value of the output.

SUMMARY OF THE INVENTION

It is an object of the present invention to provide a photometering lens in a photometering device for an SLR camera, in which the position of the light measuring receiver can be easily adjusted.

Another object of the present invention is to provide an adjusting method for easily adjusting the position of the light measuring receiver.

According to an aspect of the present invention, there is provided a photometering lens for an SLR camera in which object light transmitted through a finder screen and emitted from a reflecting optical member is received by a light measuring receiver to measure the brightness of an object.

The photometering lens includes a light path for illumination light upon assembling the light measuring receiver, the illumination light being applied from the reflecting optical member toward the light measuring receiver; and the position of the light measuring receiver is determined in accordance with an image of the light measuring receiver formed on the finder screen.

Preferably, the light path for the illumination light is provided at its one end with an illumination light incident surface formed on the photometering lens, upon which the illumination light from the outside of the pentagonal prism is made incident, so that the illumination light reaches the light measuring receiver.

The photometering lens can be adjacent to an upper portion of an emission opening of a hollow pentagonal mirror as a reflecting optical member.

Alternatively, photometering lens can be opposed to an upper portion of an end emission surface of a pentagonal prism as a reflecting optical member.

The incident surface can be defined by a plane formed by cutting a part of the incident surface of the photometering lens.

Alternatively, the incident surface can be defined by an array of triangular prisms formed on the upper peripheral surface of the photometering lens to deflect the incident illumination light toward the light measuring receiver.

Alternatively, the incident surface can be defined by an array of triangular prisms formed on the upper peripheral surface of the photometering lens which defines the emission surface of the photometering lens from which the illumination light incident upon the incident surface is emitted, to deflect the illumination light emitted therefrom toward the light measuring receiver.

Alternatively, the photometering lens can be provided at its one end with an emission surface from which the illumination light incident from the incident surface is emitted.

Alternatively, the photometering lens can be provided on the peripheral surface thereof with a reflection surface which reflects the illumination light toward the light measuring receiver.

Preferably, an incidence angle of the principal ray of the illumination light incident upon the center of the light measuring receiver is smaller than an incidence angle of the light transmitted through the center of the finder screen and the peripheral portion of the photometering lens and incident upon the center of the light measuring receiver.

Preferably, the illumination light that has been made incident upon the light measuring receiver is reflected by the light receiving surface of the light measuring receiver and is converged onto the finder screen through the photometering lens and the reflecting optical member to form an image of the light measuring receiver.

Preferably the photometering device having a photometering lens and a light measuring receiver for an SLR camera includes: making illumination light emitted from a light source provided out of the reflecting optical member incident upon an incident light path of the photometering lens, wherein an image of a light receiving surface of the light measuring receiver is formed on the finder screen through the photometering lens and the reflecting optical member by the illumination light reflected by the light receiving surface of the light measuring receiver; and adjusting the position of the light measuring receiver in accordance with the image of the light receiving surface formed on the finder screen.

Alternatively, the photometering device further includes: picking up the image of the light receiving surface formed on the finder screen by a video camera; and indicating the picked-up image on a display.

The present disclosure relates to subject matter contained in Japanese Patent Application No. 09-190997 (filed on Jul. 16, 1997) which is expressly incorporated herein by reference in its entirety.

BRIEF DESCRIPTION OF THE DRAWINGS

The present invention will be discussed below in detail with reference to the accompanying drawings, in which.

DESCRIPTION OF THE PREFERRED EMBODIMENT

Figure 1:
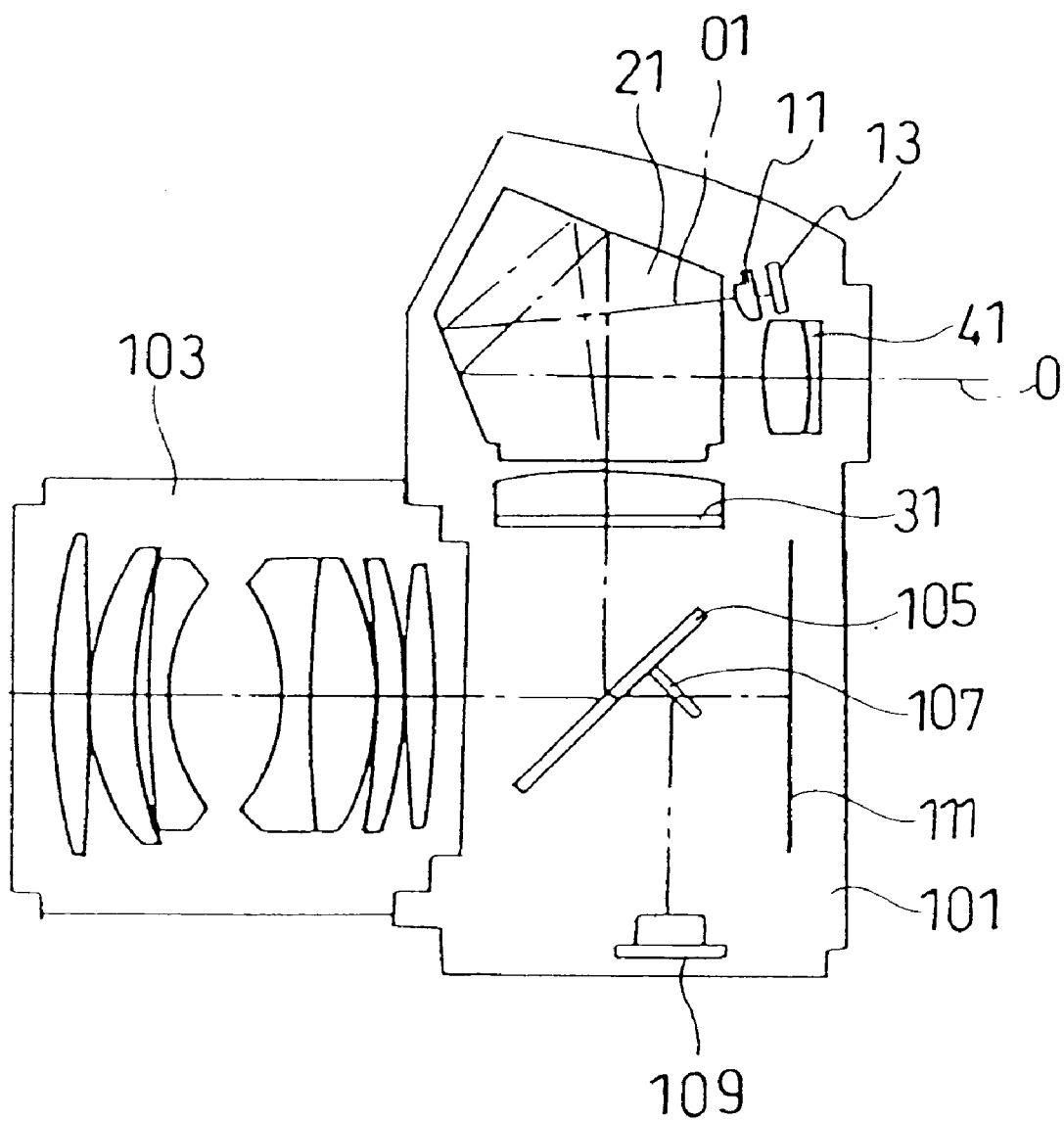
FIG. 1 is a schematic view of an SLR camera to which the present invention is applied.
Figure 2:
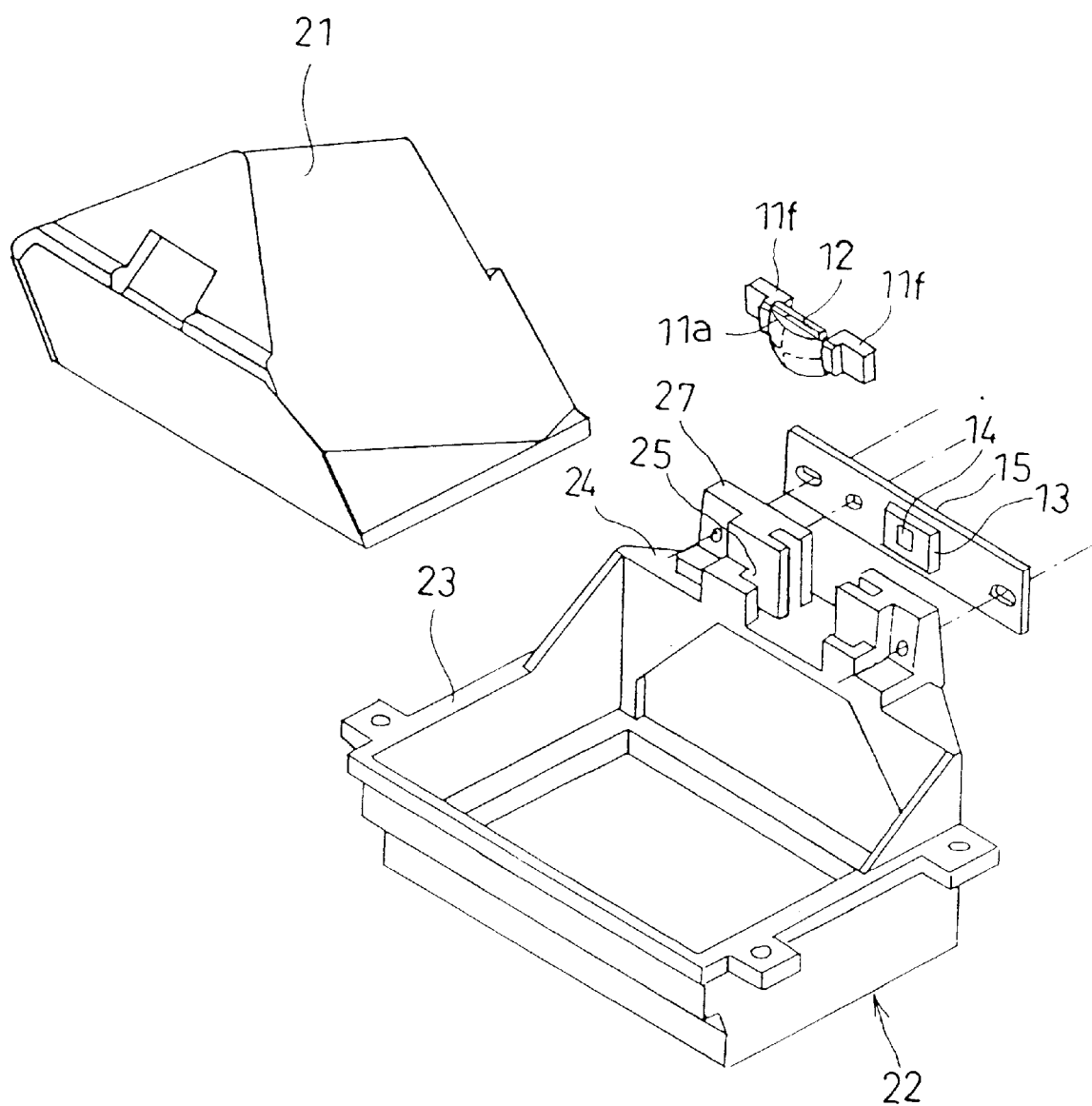
FIG. 2 is an exploded perspective view of a photometering device for an SLR camera and a pentagonal prism and the surroundings thereof, according to the present invention.
Figure 3:
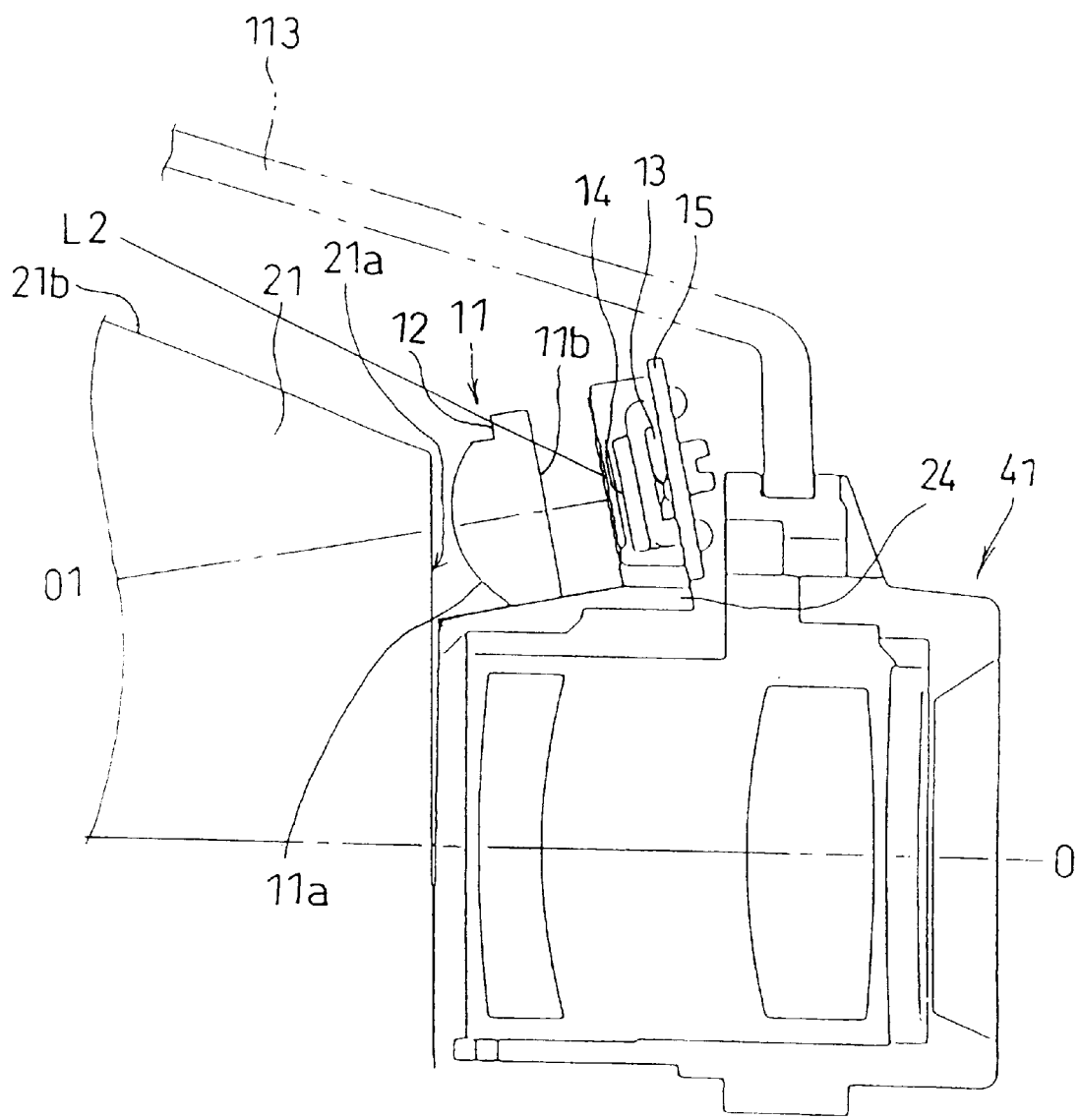
FIG. 3 is an enlarged sectional view of a photometering device for an SLR camera according to the present invention.
Figure 10:
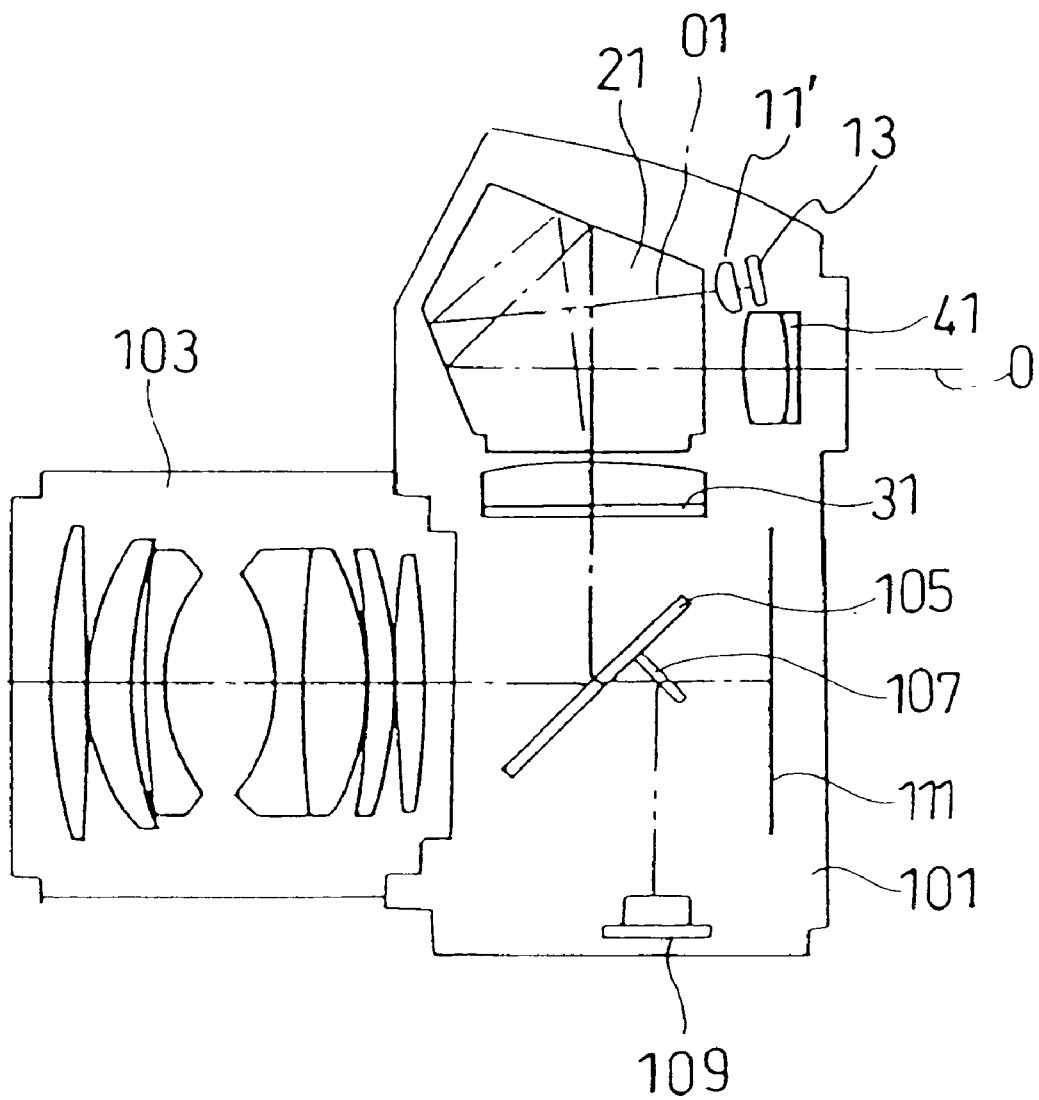
FIG. 10 is a schematic view of a known SLR camera.
Figure 11:
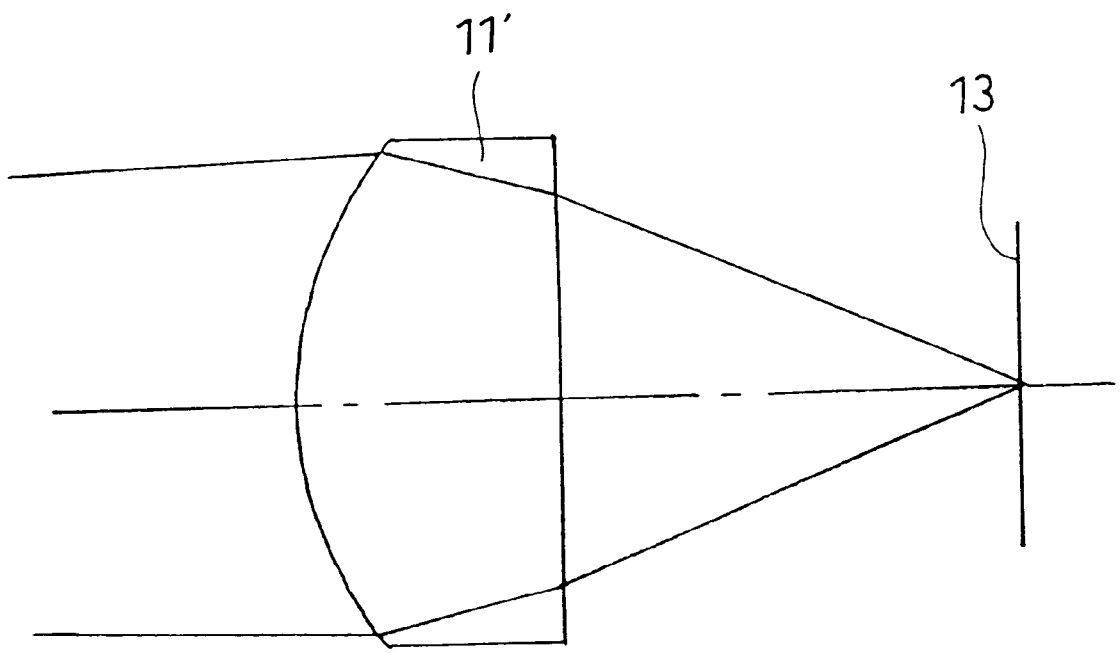
FIG. 11 is a sectional view of a known photometering lens.

FIG. 1 shows a sectional view of an SLR camera to which the present invention is applied. FIG. 2 shows an exploded perspective view of a photometering device for an SLR camera shown in FIG. 1 and a hollow pentagonal mirror (a reflecting optical member) and the surroundings thereof. FIG. 3 shows a photometering device during the assembling operation. In the drawings, the elements corresponding to those shown in FIG. 10 are designated with like reference numerals, and no duplicate explanation therefor will be given below.

Figure 5:
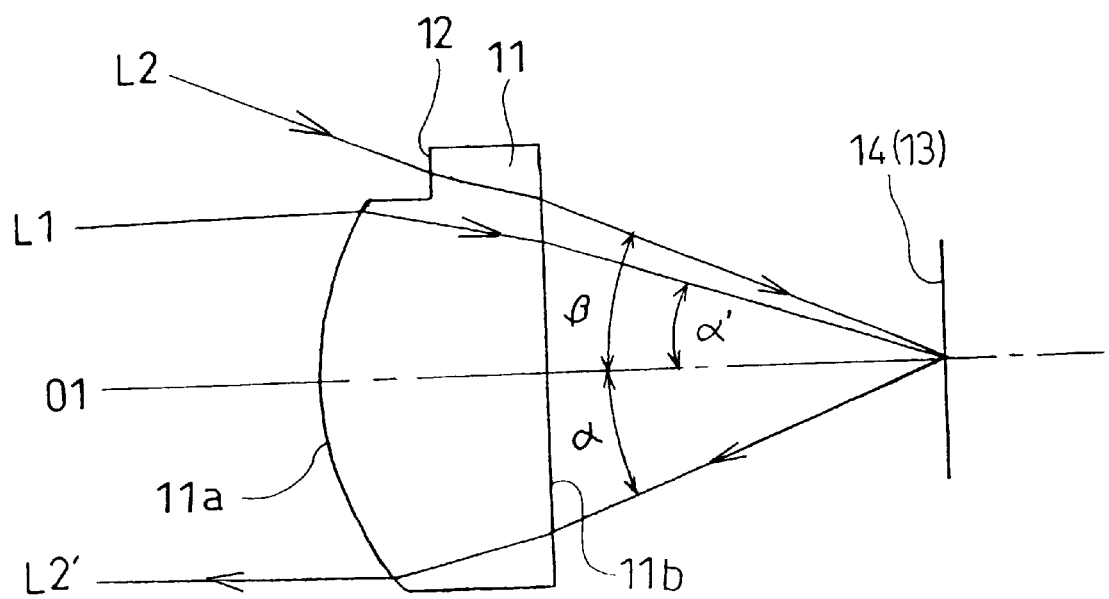
FIG. 5 is an enlarged schematic view of the first embodiment of a photometering lens of a photometering device according to the present invention.
Figure 9:
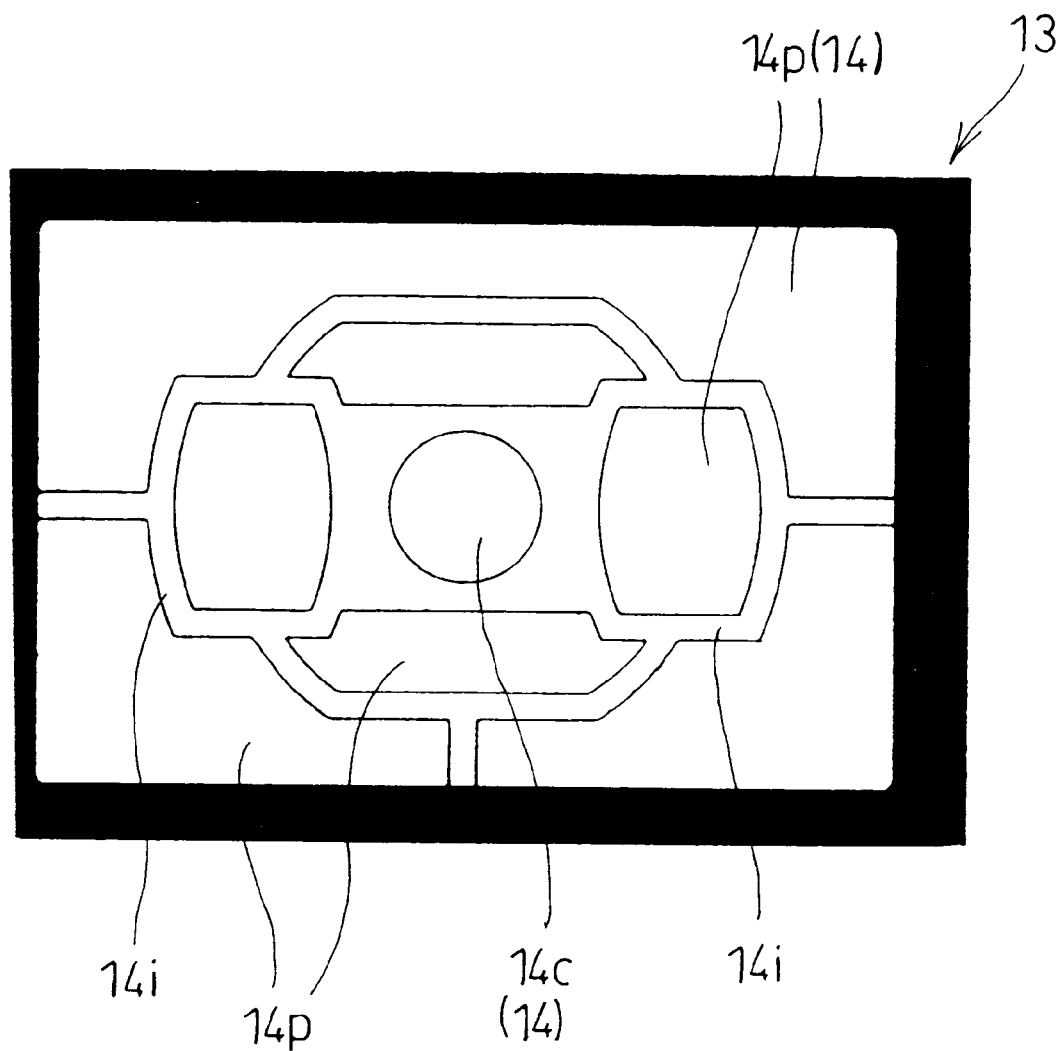
FIG. 9 is a plan view of a light measuring receiver (light receiving element) having divided brightness measuring areas.

As shown in FIGS. 2, 3 and 5, the photometering lens 11 constitutes a plano-convex lens having a first convex surface 11a and a second planar surface 11b. The photometering lens 11 is provided on its opposite sides with mounting flanges 11f integral therewith. The light measuring receiver 13 constitutes a divided type light measuring receiver, secured to a substrate 15. As shown in FIG. 9, the light measuring receiver 13 is provided with a light receiving area (surface) 14 including a center area 14c and a plurality of split peripheral areas 14p which corresponds to the center portion and a plurality of split peripheral portions of the finder screen 31. Boundaries between the split light receiving areas 14c, 14p are separated by insulating portions 14i.

The photometering lens 11 and the light measuring receiver 13 are attached to a prism holder frame 22 which is adapted to mount the hollow pentagonal mirror (reflecting optiucal member) 21 to the camera body. The prism holder frame 22 is equipped with a support portion 23 on which the hollow pentagonal mirror 21 is placed and a photometering device mounting portion 24 which bridges an emission opening of the hollow pentagonal mirror 21 placed on the support portion 23. The mounting portion 24 is provided with a lens guide groove 25 to which the photometering lens 11 is fitted, and a substrate mounting wall 27 to which the substrate 15 of the light measuring receiver 13 is mounted. The finder screen 31 is secured to the lower surface of the support portion 23 of the prism holder frame 22.

The flanges 11f of the photometering lens 11 are fitted in the lens guide groove 25 and are secured thereto by an adhesive or the like. The substrate 15 is adjustably attached to the substrate mounting wall 27 by screws (not shown). The assembly is shown in FIG. 3.

In the illustrated embodiment, the photometering lens 11 is secured to the mounting portion (photometering device securing frame) 24 integral with the prism holder frame 22, so that the first convex surface 11a of the photometering lens 11 is opposed to the end emission surface 21a of the hollow pentagonal mirror 21. The light measuring receiver 13 is secured to the mounting portion 24 through the substrate 15 by screws.

The photometering operation in an SLR camera having the photometering device constructed as above is carried out as follows.

A part of the light transmitted through the finder screen 31, reflected by the hollow pentagonal mirror 21, and emitted from the end emission surface 21a is converged onto the light receiving surface 14 of the light measuring receiver 13 by the photometering lens 11. Namely, the image of the finder screen 31 is formed on the light receiving surface 14. The finder screen 31 and the light receiving surface 14 of the light measuring receiver 13 are optically conjugate with each other with respect to the photometering lens 11, so that the image on the finder screen 31 can be projected onto the light receiving surface 14 of the light measuring receiver 13 to measure the brightness of an object.

On the other hand, upon examination, the light measuring receiver 13 (light receiving surface 14) is illuminated with light, and the image of the light measuring receiver 13 is projected onto the finder screen 31, so that the image can be viewed.

Note that the light measuring receiver 13 outputs a brightness signal depending on the brightness distribution of the image of the finder screen 31 formed on the split light receiving areas 14c and 14p of the light receiving surface 14.

Figure 4A:
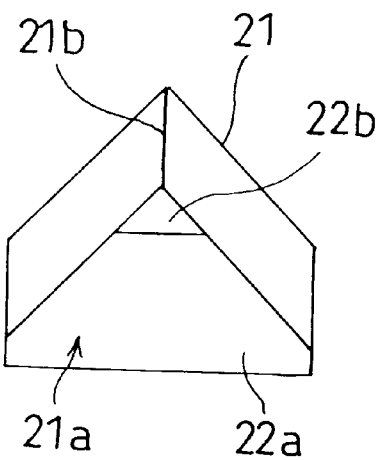
FIGS. 4A and 4B are explanatory views showing a relationship among an emission surface of a hollow pentagonal mirror, an eyepiece area, a photometering area, an illumination area, and a photometering lens, in an SLR camera according to the present invention.

In FIG. 4A, the hollow pentagonal mirror 21 is viewed from the side of the eyepiece 41. A large part of the light emitted from the emission surface 21a of the hollow pentagonal mirror 21 is emitted from the eyepiece aperture 22a and reaches the eyepiece 41. The light emitted from the photometering aperture 22b which is defined by a small triangular area at the upper corner of the emission surface 21a reaches the photometering lens 11 to form an image of the finder screen 31, i.e., to measure the object brightness.

Figure 4B:
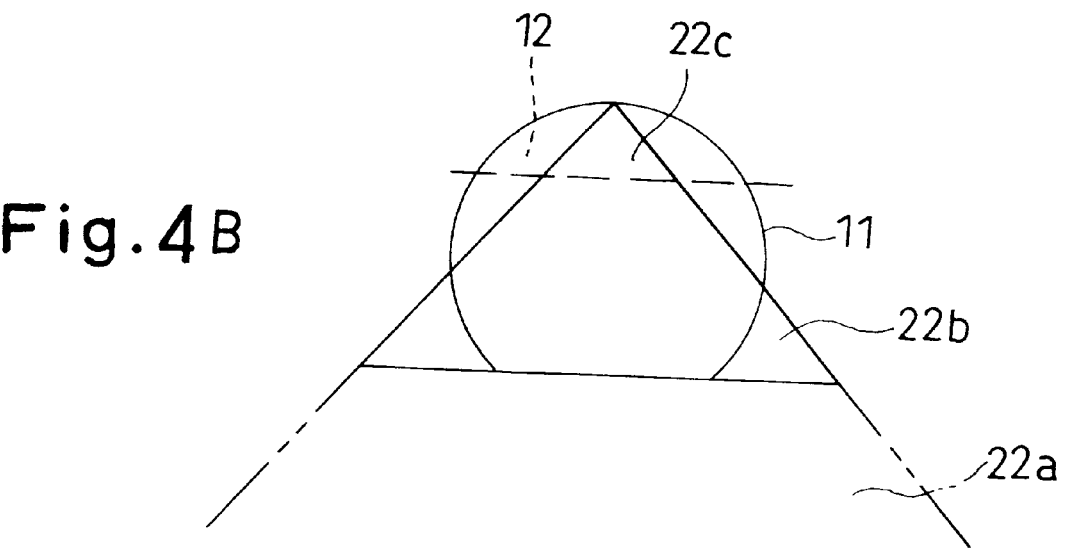

FIG. 4B shows the relationship between the eyepiece aperture 22a, the photometering aperture 22b and the photometering lens 11. The diameter of the photometering lens 11 is large enough to cover a substantial part of the photometering aperture 22b so as to converge the object light transmitted through the photometering aperture 22b. In the illustrated embodiment, a small area at the upper corner within the photometering aperture 22b is defined as an illumination area 22c. The illumination area 22c is adjacent to the ridge 21b of the hollow pentagonal mirror 21, so that the illumination area 22c has little influence on the brightness measurement.

FIG. 5 shows a first embodiment of the photometering lens 11. The photometering lens 11 is provided with an illumination incident surface 12 at the upper portion of the first surface 11a, which makes the light incident along the ridge 21b of the hollow pentagonal mirror 21 incident upon the center portion of the light receiving surface 14 of the light measuring receiver 13. The planar illumination incident surface 12 is formed by cutting the upper portion of the first surface 11a in the lateral direction perpendicular to the optical axis O1.

The light incident upon the illumination incident surface 12 and illuminating the light receiving surface 14 is reflected by the light receiving surface 14, is transmitted through the photometering lens 11, is reflected by the hollow pentagonal mirror 21, and is received by the finder screen 31 to form an object image of the light receiving surface 14 thereon. Consequently, the position of the light receiving surface 14 relative to the finder screen 31 can be detected by measuring the brightness distribution of the finder screen from the photographing lens side.

Specifically, the centering operation (adjustment) of the light measuring receiver 13 of the photometering device having the photometering lens 11 is carried out as follows.

The position adjustment of the light measuring receiver 13 is effected after the hollow pentagonal mirror 21 is mounted to the camera body, the photometering lens 11 is secured, and the light measuring receiver 13 is provisionally mounted, before the upper cover 113 is mounted to the camera body. The light source (LED, for example) of the illumination light is placed on the ridge 21b of the hollow pentagonal mirror 21 or on a forward extension thereof so as to illuminate the light receiving surface 14 with the light along the ridge 21b.

The illumination light incident upon the light receiving surface 14 is reflected thereby and travels in the finder optical system in the opposite direction. Namely, the light reflected by the light receiving surface 14 is transmitted through the photometering lens 11 and the hollow pentagonal mirror 21 in the opposite direction and is made incident upon the finder screen 31. That is, the image of the light receiving surface 14 is formed on the finder screen 31. The operator can view the finder screen 31 through his or her eyes directly or through the photographing lens 103. Alternatively, it is possible to pickup the image using a CCD camera to which an image pickup lens is mounted in place of the photographing lens 103, so that the image indicated on a monitor screen can be viewed by the operator. The light receiving surface 14 is provided with a plurality of light receiving areas 14c, 14p and the insulation portion 14i by which the light receiving areas 14c, 14p are divided and isolated from one another. The light receiving areas 14c, 14p and the insulation portion 14i have different reflectivities. Consequently, the boundaries between the light receiving areas 14c, 14p can be discriminated by viewing the image on the finder screen 31 or the picked-up image indicated on the monitor screen. Since the direction and amount of deviation of the center area of the light measuring receiver from the center can be easily detected on the monitor, the operator can easily adjust the position of the light measuring receiver 13 within a shorter time. Thus, the centering operation can be easily and quickly carried out.

Upon completion of the position adjustment, the substrate 15 is immovably secured by screws or an adhesive, etc.

Figure 6A:
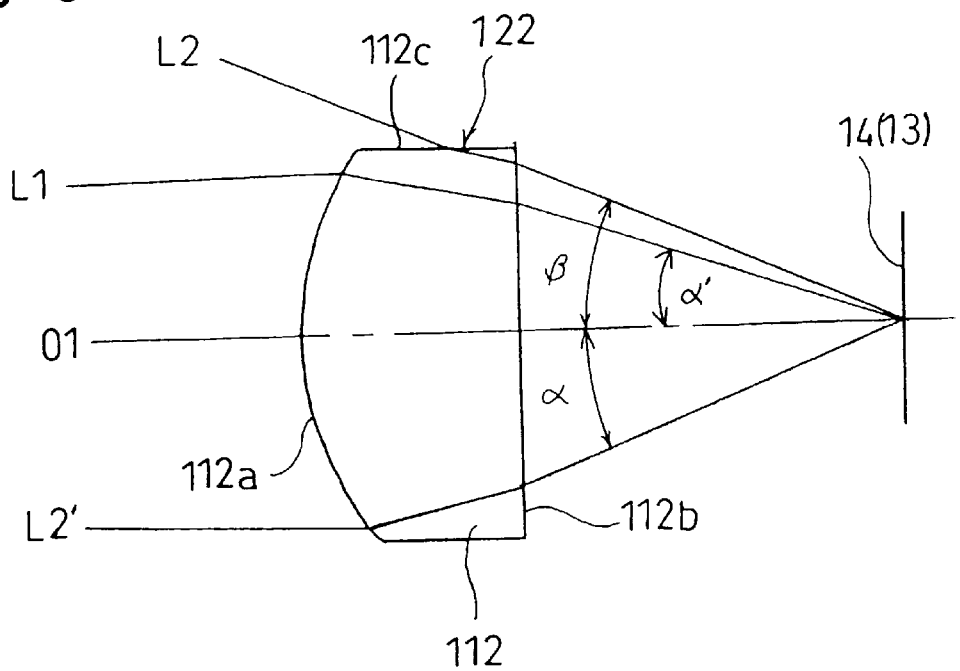
FIGS. 6A and 6B are enlarged schematic views of a second embodiment of a photometering lens of a photometering device according to the present invention.
Figure 6B:
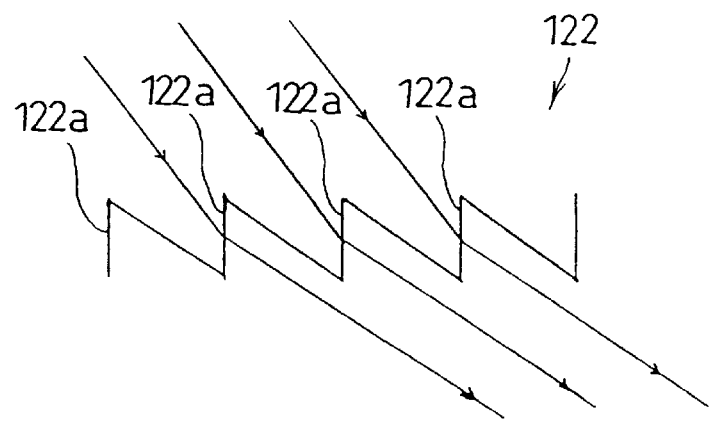

FIGS. 6A and 6B show a second embodiment of the photometering lens. In this embodiment, the photometering lens 112 is provided on its upper peripheral edge 112c with a prism surface 122 consisting of a triangular prism array (right angle prism array). Each triangular prism is provided with a first surface 122a which is perpendicular to the optical axis O1, so that the first surfaces 122a are continuously arrayed in parallel along the optical axis O1. The illumination light incident upon the first surfaces 122a of the triangular prisms is refracted toward the optical axis O1 and is transmitted through the photometering lens 112. The illumination is thereafter emitted from the second surface 112b of the photometering lens 112 and is made incident upon the light receiving surface 14.

Figure 7A:
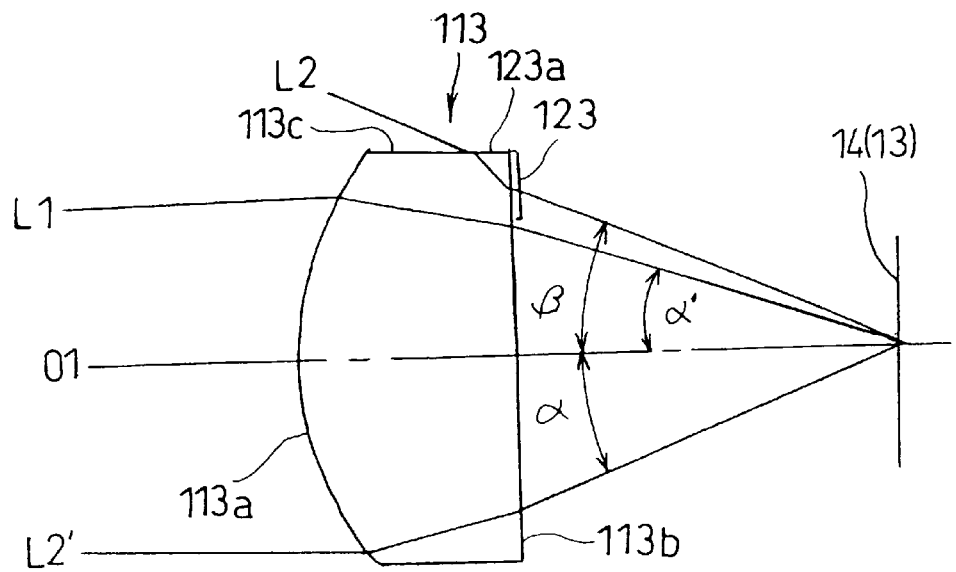
FIGS. 7A and 7B are enlarged schematic views of a third embodiment of a photometering lens of a photometering device according to the present invention.
Figure 7B:
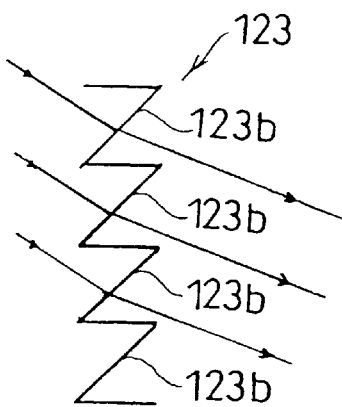

FIG. 7 shows a third embodiment of the photometering lens. In this embodiment, a prism surface 123 is provided on the second surface 113b of the photometering lens 113, unlike the second embodiment in which the prism surface 122 is provided on the upper peripheral edge of the photometering lens 112. The prism surface 123 consists of an array of parallel triangular prisms which extend in a direction perpendicular to the optical axis O1. Each triangular prism is provided with a surface parallel with the optical axis O1 and an oblique surface 123b which forms an acute angle with respect thereto, so that the oblique surfaces 132b are continuously arrayed in parallel in a direction perpendicular to the optical axis O1. The illumination light is made incident upon the peripheral edge 113c of the photometering lens 113 and is emitted from the prism surface 123 of the second surface 113b. The illumination light is emitted from the oblique surfaces 123b of the prism surface 123. Upon emission, the light is deflected (retracted) toward the optical axis O1 and made incident upon the light receiving surface 14.

Note that the prism surface 122 or 123 in the second or third embodiment can be replaced with a Fresnel lens or other surface which can deflect and converge the illumination light toward the light receiving surface 14.

Figure 8:
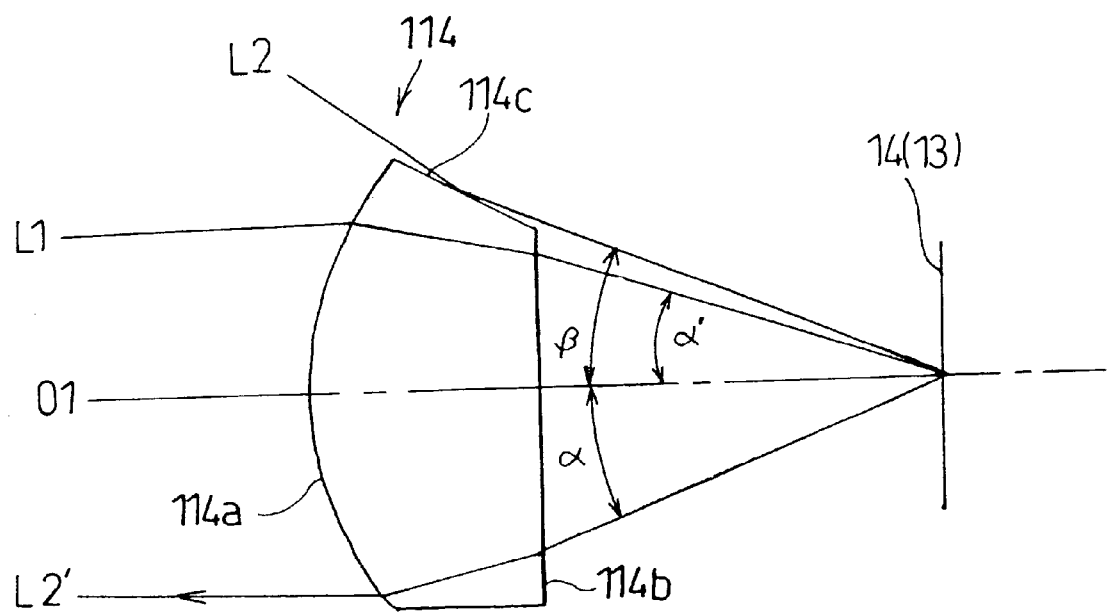
FIG. 8 is an enlarged schematic view of a fourth embodiment of a photometering lens of a photometering device according to the present invention.

FIG. 8 shows a fourth embodiment of the photographing lens. Unlike the above mentioned embodiments in which the illumination light is transmitted through the photometering lens, the illumination light is reflected by the photometering lens and is made incident upon the light receiving surface 14 in the fourth embodiment. Namely, in the fourth embodiment, the upper peripheral edge portion 114c of the photometering lens 114 is inclined toward the light measuring receiver 13, so that the light reflected by the oblique surface 114c is made incident upon the light receiving surface 114. With this arrangement, the structure can be simplified since it is necessary only to incline the upper peripheral surface of the photometering lens with respect to the optical axis O1.

In the embodiments mentioned above, as shown in FIGS. 5, 6A, 7A and 8, "L2" is defined by principal light ray which passes through the illumination incident surface 12 of FIG. 5, or the prism surface 122 of FIG. 6, or the prism surface 123 of FIG. 7A, or the oblique surface 114c of FIG. 8, of the photometering lens and reaches the light receiving surface 14. "β" is defined by an angle between this principal light ray and the optical axis O1 of the photometering lens. Furthermore, "L2'" is defined by outermost the light ray which is reflected (emitted) from the center of light receiving surface 14 on the optical axis and passes through the peripheral edge (outermost) portion of the photometering lens 11. "α" is defined by an angle between the outermost light ray L2' and the optical axis O1. Considering the above definitions, it is preferable for the angle β to be equal to or smaller than the angle a since a large part of the illumination light incident upon the light receiving surface 14 reaches the photometering lens, and hence a brighter image of the light receiving surface 14 having a uniform brightness can be obtained. Consequently, the direction and position of the light receiving surface 14 (13) can be precisely detected, and hence, the position of the light receiving surface 14 and the light measuring receiver 13 can be easily and precisely adjusted. Note that the light ray "L1" is defined by outermost light ray which passes through the incident surface 11a (112a, 113a or 114a) of the photometering lens at the side of the ilumination incident surface 12 (FIG. 5), or the prism surface 122 (FIG. 6), or the prism surface 123 (FIG. 7A) or the oblique surface 114c (FIG. 8), and reaches the light receiving surface 14, and "α'" is defined by an angle between the outermost light ray L1 and the optical axis O1. α' is smaller than α.

Although the illustrated embodiments are applied to an SLR camera having a hollow pentagonal mirror as a reflecting optical member, the present invention can be applied to an SLR camera having a pentagonal prism or like that which functions as a reflecting optical member.

As can be understood from the above discussion, according to the present invention, since the photometering lens provides a light path in which the illumination light from the outside of the finder optical path passes to illuminate the light measuring receiver, it is possible to illuminate the light measuring receiver without providing an additional element for the light path. Moreover, since the light reflected by the light measuring receiver passes in the finder optical system in the opposite direction and is projected onto the finder screen, the position of the light measuring receiver can be easily detected by viewing or picking up an image of the finder screen on the photographing lens side.

Furthermore, in an adjusting method according to the present invention, since the position of the light measuring receiver can be detected by viewing or picking up an image of the finder screen on the photographing lens side, the centering of the light measuring receiver can be easily carried out within a shorter time.

What is claimed is:

1. A photometering lens for an SLR camera in which object light transmitted through a finder screen and emitted from a reflecting optical member is received by a light measuring receiver to measure the brightness of an object, wherein said photometering lens comprises a light path for illumination light upon assembling said light measuring receiver, said illumination light being applied from said reflecting optical member toward said light measuring receiver; and wherein the position of said light measuring receiver is determined in accordance with an image of said light measuring receiver formed on said finder screen.

2. A photometering lens for an SLR camera according to claim 1, wherein said light path for said illumination light is provided at its one end with an illumination light incident surface formed on said photometering lens, upon which said illumination light from the outside of said pentagonal prism is made incident, so that said illumination light reaches said light measuring receiver.

3. A photometering lens for an SLR camera according to claim 1, wherein said reflecting optical member comprises a hollow pentagonal hollow mirror, and wherein said photometering lens is adjacent to an upper portion of an emission opening of said hollow pentagonal mirror.

4. A photometering lens for an SLR camera according to claim 1, wherein said reflecting optical member comprises a pentagonal prism, and wherein said photometering lens is opposed to an upper portion of an end emission surface of said pentagonal prism.

5. A photometering lens for an SLR camera according to claim 2, wherein said incident surface is defined by a plane formed by cutting a part of the incident surface of said photometering lens.

6. A photometering lens for an SLR camera according to claim 2, wherein said incident surface is defined by an array of triangular prisms formed on the upper peripheral surface of said photometering lens to deflect said incident illumination light toward said light measuring receiver.

7. A photometering lens for an SLR camera according to claim 2, wherein said incident surface is defined by an array of triangular prisms formed on the upper peripheral surface of said photometering lens which defines the emission surface of said photometering lens from which said illumination light incident upon said incident surface is emitted, to deflect said illumination light emitted therefrom toward said light measuring receiver.

8. A photometering lens for an SLR camera according to claim 2, wherein said photometering lens is provided at its one end with an emission surface from which said illumination light incident from said incident surface is emitted.

9. A photometering lens for an SLR camera according to claim 1, wherein said photometering lens is provided on the peripheral surface thereof with a reflection surface which reflects said illumination light toward said light measuring receiver.

10. A photometering lens for an SLR camera according to claim 1, wherein an incidence angle of the principal ray of said illumination light incident upon the center of said light measuring receiver through said light path is less than or equal to the angle of the outermost light ray emitted from the center of said light measuring receiver and transmitted through the peripheral portion of said photometering lens and incident upon said finder screen.

11. A photometering lens for an SLR camera according to claim 1, wherein said illumination light that has been made incident upon said light measuring receiver is reflected by said light receiving surface of said light measuring receiver and is converged onto said finder screen through said photometering lens and said reflecting optical member to form an image of said light measuring receiver.

12. An adjusting method for a photometering device having a photometering lens and a light measuring receiver for an SLR camera in which object light transmitted through a finder screen and emitted from a reflecting optical member is received by a light measuring receiver to measure the brightness of an object, the method comprising:

directing illumination light emitted from a light source redirected by the reflecting optical member to be incident upon an incident light path of the photometering lens, wherein an image of a light receiving surface of the light measuring receiver is formed on the finder screen through the photometering lens and said reflecting optical member by the illumination light reflected by the light receiving surface of the light measuring receiver; and adjusting the position of the light measuring receiver in accordance with the image of the light receiving surface formed on the finder screen.

13. The adjusting method of the photometering device according to claim 12, further comprising:

picking up the image of the light receiving surface formed on the finder screen by a video camera; and displaying the picked-up image on a display screen.

* * * * *